UNITED STATES PATENT OFFICE.

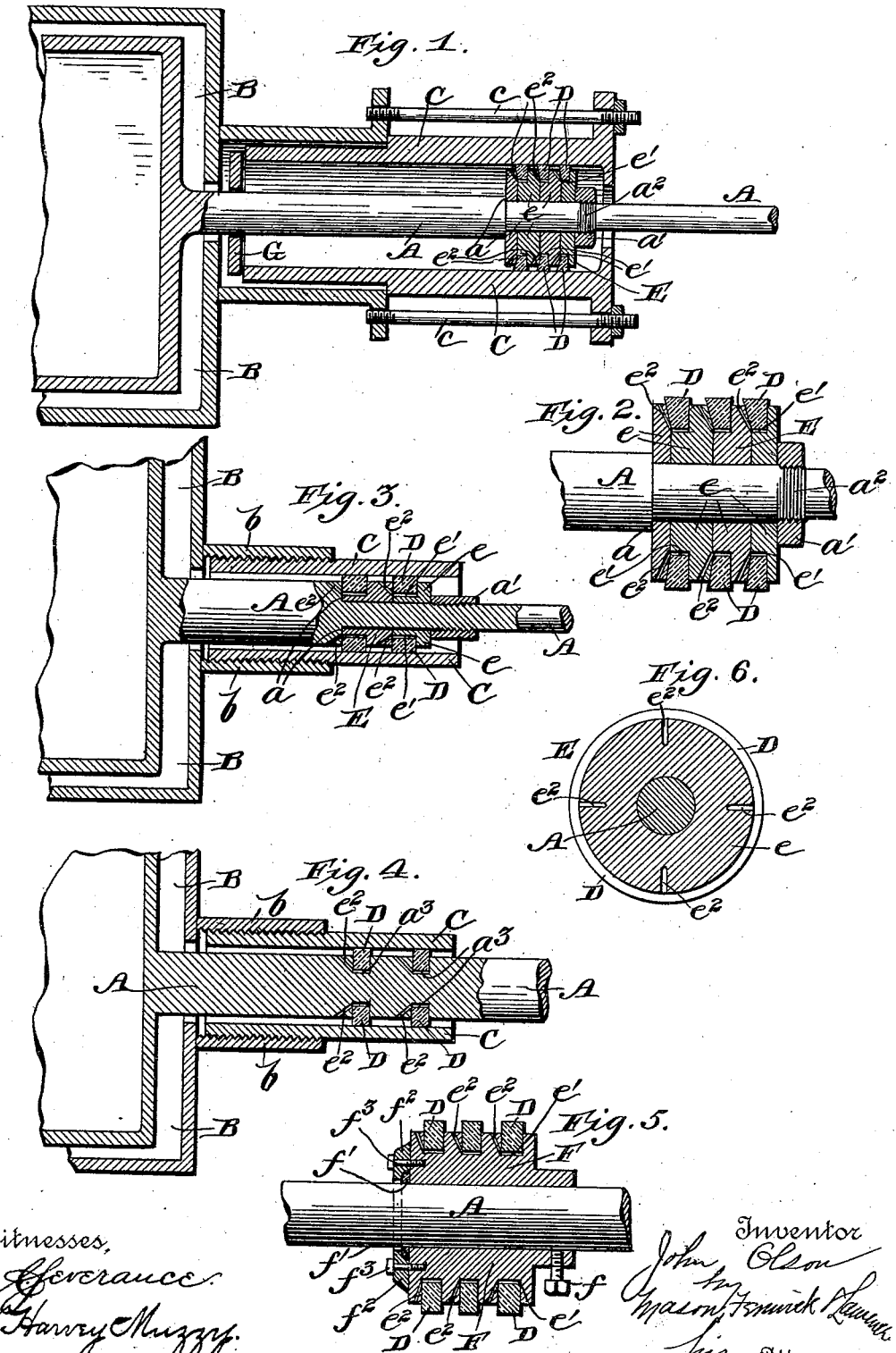
(No Model.)
J. OLSON.
VALVE STEM PACKING.
No. 515,055. Patented Feb. 20, 1894.

JOHN OLSON, OF TWO HARBORS, MINNESOTA.

VALVE-STEM PACKING.

SPECIFICATION forming part of Letters Patent No. 515,055, dated February 20, 1894.

Application filed August 11, 1893. Serial No. 482,932. (No model.)

*To all whom it may concern:*

Be it known that I, JOHN OLSON, a citizen of the United States, residing at Two Harbors, in the county of Lake and State of Minnesota, have invented certain new and useful Improvements in Valve-Stem Packing; and I do hereby declare the following to be a full, clear, and exact description of the invention, such as will enable others skilled in the art to which it appertains to make and use the same.

My invention relates to improvements in valve stem packing and is applied more particularly to the stems of valves used in steam chests.

The object of my improvement is the production of a valve stem packing which is cheap in construction and yet very durable and which is also very effective in preventing the escape of steam from the steam chest, around the sliding valve stem.

To attain these ends my invention consists in applying packing rings to the valve stem within a packing gland in such a manner that steam from the steam chest may be admitted at the base of the packing rings through small passages in the valve stem or the spider of the packing ring to keep the packing more closely in contact with the inner surface of the packing gland, also in so constructing the packing that any steam which may blow past one packing ring will be arrested by another packing ring which is adapted to be kept tight by the steam pressure.

My invention will be fully understood by reference to the accompanying drawings in which—

Figure 1. is a longitudinal section through a valve stem packing gland the packing rings being also shown in section on the valve stem. Fig. 2. is an enlarged sectional view of the packing rings and spider. Fig. 3, is a longitudinal section of a valve stem packing one packing ring being applied directly against a large shoulder on the valve stem. Fig. 4. is a similar view to Fig. 3 each ring being shouldered on the valve stem. Fig. 5 is a sectional view of a packing applied to the valve stem by means of a solid spider, and Fig. 6. is a cross section through the valve stem and packing showing the disposition of the passages for admitting steam beneath the packing rings.

A is a valve stem having on one end a valve yoke adapted to move the valve in the usual manner in a steam chest B. and its other extremity extending to a valve operating mechanism of ordinary construction not shown.

C. is a packing gland which may be either bolted to the steam chest as in Fig. 1. by the bolts $c$. or may have one of its ends screw threaded to be screwed into a threaded portion $b$. of the steam chest as in Figs. 3 and 4.

In order to prevent any escape or "blowing" of steam around the moving valve stem, packing rings D made of any material suitable for keeping a snug contact with the inner surface of the gland $c$. are applied to the valve stem A as will be more fully described. In applying the rings D to the valve stem, a preferred construction is the employment of a spider E. composed of sections $e$. which hold the rings D. in proper position by means of their annular recesses $e'$. The spider E. is fixed upon the valve stem by resting on one end against a shoulder $a$. formed upon the valve stem and by a nut $a'$ on the other end, the latter engaging a threaded portion $a^2$ of the valve stem. By this construction packing rings of a desirable size may be used, no difficulty being experienced in putting in place the spider sections and packing rings in proper order and clamping the whole by the nut $a'$ and also any necessary tightening up may be perfected. Each ring shaped section $e$ of the spider E except the one next to the nut $a'$, has a series of oblique passages $e^2$ extending from the peripheries of said sections to the base of the channels in which the packing rings are seated. The seats for the packing rings are in the form of rabbets, in the constructions shown in Figs. 1 and 2.

The location of the passages $e^2$ is plainly indicated in Fig. 6; and the manner in which they lead into the seats of the packing rings and communicate with an annular steam passage leading from the valve chest B and with the respective packing ring channel-seats, is shown in the other figures of the drawings.

The office of the passages $e^2$ is to admit of a little steam getting into the channel seats from the forward sides of the sections beneath the packing rings D and by its pressure force said rings into snug and even contact with the vertical faces of the rabbet seats and against the inner surface of the gland C within which the spider carrying the packing rings slides during any movement of the valve stem A; said steam being admitted from the outside or periphery of the valve stem A on oblique lines.

A great advantage results from the arrangement and construction of the within described spider with packing rings and passages, for if any steam should leak past the first of the rings it will be conducted to the base of the next ring by means of an oblique passage $e^2$ and so on according to the number of sections and packing rings employed, and thus the leakage of steam will be arrested and a perfect tight valve stem insured, even though the first or the second rings should leak steam.

In Fig. 3 the sections $e$ of the spider are smaller relatively to the shoulder $a$ of the valve stem A, than in Figs. 1 and 2, and an inner spider section is dispensed with, the first packing ring coming next to the shoulder $a$. said shoulder being provided with the passages $e^2$. Or if it is desired not to use any spider the packing rings may be seated in recesses $a^3$ formed in the valve stem A and the valve stem provided with the passages $e$. as shown in Fig. 4. By the construction shown in Figs. 3. and 4 a very small surface area for the lateral pressure of the steam is afforded, which is an advantage.

Instead of using a spider made in sections as in Fig. 1. a solid spider as F. Fig. 5 may be used its periphery being provided with the annular recesses $e'$ for the packing ring D and the steam passages $e^2$. It is not necessary to employ a nut and shoulder to fix the spider upon the valve stem, for the spider may be held in place by a clamp screw $f$. as in said Fig. 5. When no shoulder is used it is advisable in order to prevent the "blowing" of steam between the valve stem and spider, to use a gasket $f'$ which in this instance is shown secured in place by the clamping ring $f^2$ and set screws $f^3$.

The packing rings D may have a rectangular shape in cross-section as shown in Figs. 3, 4, and 5 or be formed wider at their outer peripheries than their inner ones as in Figs. 1 and 2. In the latter construction the steam can more easily force the packing rings outward.

In Fig. 1, a metallic ring G is shown fitting loosely on the valve stem A which serves to break the force of the steam and lessen its pressure on the inside of the spider E.

It will be observed that my packing is secured to and moves with the valve stem and is very different from a packing secured in a gland through which the valve stem passes.

Having described my invention, what I claim, and desire to secure by Letters Patent, is—

1. In a valve stem packing mechanism, of the type herein described, the combination of two or more spaced packing rings, peripheral seat channels for said packing rings, oblique steam admission passages extending from the periphery of the support of the packing rings to the back of the packing rings, and in communication with an annular steam space which is between the valve stem and the packing gland, and also in communication with two or more of the packing seat channels at points below the packing whenever leakage of steam takes place forward of the first packing ring; whereby the first packing ring can be expanded by steam from the valve chest, and in the event of leakage occurring behind said ring, steam can pass beneath a second packing ring and expand it, and so on according to the number of rings employed, substantially as described.

2. A spider E carrying packing rings D formed of a series of rabbeted ring sections E forming spaced packing seats and each having an oblique peripheral steam inlet $e^2$ leading into its rabbet seat below the packing ring, said sections being arranged between a shoulder and an adjusting nut on a valve stem, the steam inlet passage of the forward section being in communication with an annular steam space between the valve stem and the packing gland and in the event of leakage behind the first packing ring, the steam inlet to the channel seat of the second packing ring will also be in communication with said annular steam space and so on according to the number of rings employed, substantially as described.

3. The combination with the packing gland, the valve stem, the packing rings, means carrying said rings provided with oblique peripheral steam inlet passages leading beneath the packing rings into annular channel seats in which the packing rings are seated and the loose sliding steam checking ring G, substantially as described.

In testimony whereof I affix my signature in presence of two witnesses.

JOHN OLSON.

Witnesses:
H. O. OLSON,
CHARLES M. FLOATHE.